United States Patent
Ward et al.

(10) Patent No.: US 11,364,800 B2
(45) Date of Patent: Jun. 21, 2022

(54) THROTTLE PEDAL ASSEMBLY

(71) Applicant: MARINE ACQUISITION (US) INCORPORATED, Limerick, PA (US)

(72) Inventors: Thomas F. Ward, Downingtown, PA (US); Mark Douglas Petro-Roy, Lansdale, PA (US); David Wolfe, Hatfield, PA (US)

(73) Assignee: Marine Acquisition (US) Incorporated, Limerick, PA (US)

( * ) Notice: Subject to any disclaimer, the term of this patent is extended or adjusted under 35 U.S.C. 154(b) by 488 days.

(21) Appl. No.: 16/557,946

(22) Filed: Aug. 30, 2019

(65) Prior Publication Data
US 2020/0070656 A1 Mar. 5, 2020

Related U.S. Application Data

(60) Provisional application No. 62/725,178, filed on Aug. 30, 2018.

(51) Int. Cl.
| | | |
|---|---|---|
| *G05G 1/30* | (2008.04) | |
| *B60K 26/04* | (2006.01) | |
| *F02D 11/04* | (2006.01) | |
| *G05G 1/44* | (2008.04) | |
| *B60K 26/02* | (2006.01) | |

(52) U.S. Cl.
CPC ............ *B60K 26/04* (2013.01); *F02D 11/04* (2013.01); *G05G 1/30* (2013.01); *B60K 26/02* (2013.01); *B60K 2026/043* (2013.01); *G05G 1/44* (2013.01)

(58) Field of Classification Search
CPC ............. G05G 1/30; G05G 1/44; B60K 26/02
See application file for complete search history.

(56) References Cited

U.S. PATENT DOCUMENTS

| | | | | |
|---|---|---|---|---|
| 2,985,031 | A | * 5/1961 | Bennett | B63H 21/213 74/109 |
| 3,002,398 | A | 10/1961 | Beamer | |
| 4,631,034 | A | * 12/1986 | Menne | B63H 25/02 74/471 R |
| 5,138,899 | A | * 8/1992 | Katagiri | B60T 7/06 74/529 |
| 5,529,296 | A | 6/1996 | Kato et al. | |
| 5,649,606 | A | * 7/1997 | Bebernes | B62D 11/183 180/6.48 |
| 5,865,068 | A | * 2/1999 | Huntley | G05G 1/30 74/513 |
| 6,008,797 | A | * 12/1999 | Sanderson | G05G 1/30 345/157 |
| 6,058,796 | A | 5/2000 | Huntley | |
| 6,220,112 | B1 | * 4/2001 | Graham | F16H 61/22 74/513 |

(Continued)

*Primary Examiner* — Richard W Ridley
*Assistant Examiner* — Brian J McGovern

(57) ABSTRACT

A throttle pedal assembly comprises a base, a pedal pivotably mounted on the base, and a gear box coupled to the pedal. The gear box has a throttle wheel with a plurality of throttle cable terminal attachment locations and the gear box has a plurality of throttle cable mounting locations. A throttle cable is selectively and releasably attached to one of said plurality of throttle cable terminal attachment locations, and the throttle cable is selectively and releasably attached to one of said plurality of throttle cable mounting locations.

8 Claims, 11 Drawing Sheets

(56) References Cited

U.S. PATENT DOCUMENTS

| | | | |
|---|---|---|---|
| 6,223,623 B1* | 5/2001 | Vance | G05G 1/30 74/513 |
| 6,364,047 B1* | 4/2002 | Bortolon | B60K 23/02 74/513 |
| 6,389,927 B1 | 5/2002 | Willemsen | |
| 6,536,300 B1* | 3/2003 | Gonring | G05G 1/405 74/513 |
| 2004/0130156 A1* | 7/2004 | Hartman | H02J 7/32 290/1 A |
| 2005/0016318 A1* | 1/2005 | Allard | B60K 26/021 74/512 |
| 2009/0038431 A1 | 2/2009 | Willemsen et al. | |
| 2009/0223319 A1 | 9/2009 | Choi | |
| 2011/0132134 A1* | 6/2011 | Kim | F02D 11/02 74/514 |
| 2011/0289666 A1* | 12/2011 | Owen, Jr. | A47K 13/10 4/246.3 |
| 2015/0355669 A1* | 12/2015 | Dumitrescu | G05G 5/08 74/478 |
| 2018/0056949 A1* | 3/2018 | Pennala | B60T 7/06 |
| 2021/0096590 A1* | 4/2021 | Petro-Roy | G05G 1/38 |

\* cited by examiner

THROTTLE PEDAL ASSEMBLY

This application claims priority of U.S. Provisional Application No. 62/725,178, filed Aug. 30, 2018, the entire content of which is hereby incorporated by reference.

TECHNICAL FIELD

The present disclosure relates to a throttle pedal assembly and, in particular, to a throttle pedal assembly having a throttle wheel with a plurality of throttle cable terminal attachment locations.

U.S. Pat. No. 2,985,031 which issued on May 23, 1961, in the name of Bennett discloses a remote control to be actuated by foot for control of outboard motors. The remote control comprises a base and a plurality of adjustable legs mounted on the base. There is a pad on each leg. The pads are substantially universally adjustable relative to the legs for application to a contoured surface. There is a pivoted foot treadle mounted on the base, a sector gear on the base, a link connecting said foot treadle to said sector gear to oscillate the latter, a rack, and means on the base to rectilinearly guide and constrain the rack. The sector gear is in engagement with the rack to move the same. There is a motor control cable secured to the rack for actuation thereby in conformance to the motion of the treadle.

U.S. Pat. No. 6,058,796 which issued on May 9, 2000, in the name of Huntley discloses a foot throttle for boats. An eccentric is rotated by operation of a foot pedal and wherein the eccentric is biased directly against an adjustable limiter thus eliminating imprecise positioning of the throttle caused by loose tolerances in the pedal mechanism which actuates the eccentric.

SUMMARY

There is provided a throttle pedal assembly comprising a base, a pedal pivotably mounted on the base, and a gear box coupled to the pedal. The gear box has a throttle wheel with a plurality of throttle cable terminal attachment locations and the gear box has a plurality of throttle cable mounting locations. A throttle cable is selectively and releasably attached to one of said plurality of throttle cable terminal attachment locations, and the throttle cable is selectively and releasably attached to one of said plurality of throttle cable mounting locations.

The throttle wheel may have an axis of rotation. The throttle cable terminal attachment locations may define an inner race and an outer race about the axis of rotation. The gear box may have a housing and a housing cover. The cable mounting locations may be keyed into a wall of the housing or a wall of the housing cover or both. The pedal may be coupled to the gear box by a cable actuation mechanism which drives the throttle wheel. The cable actuation mechanism and the throttle wheel may be disposed within a housing of the gear box. The base may include a base plate and a slider plate which is slidable relative to the base plate. The pedal may be mounted on the slider plate. The base may be provided with a detent to maintain the slider plate in a desired location relative to the base plate. An orientation point of the throttle cable may be adjusted by pivoting the gear box relative to the pedal.

BRIEF DESCRIPTION OF THE DRAWINGS

The invention will be more readily understood from the following description of the embodiments thereof given, by way of example only, with reference to the accompanying drawings, in which.

DESCRIPTION OF SPECIFIC EMBODIMENTS

Figure 1:
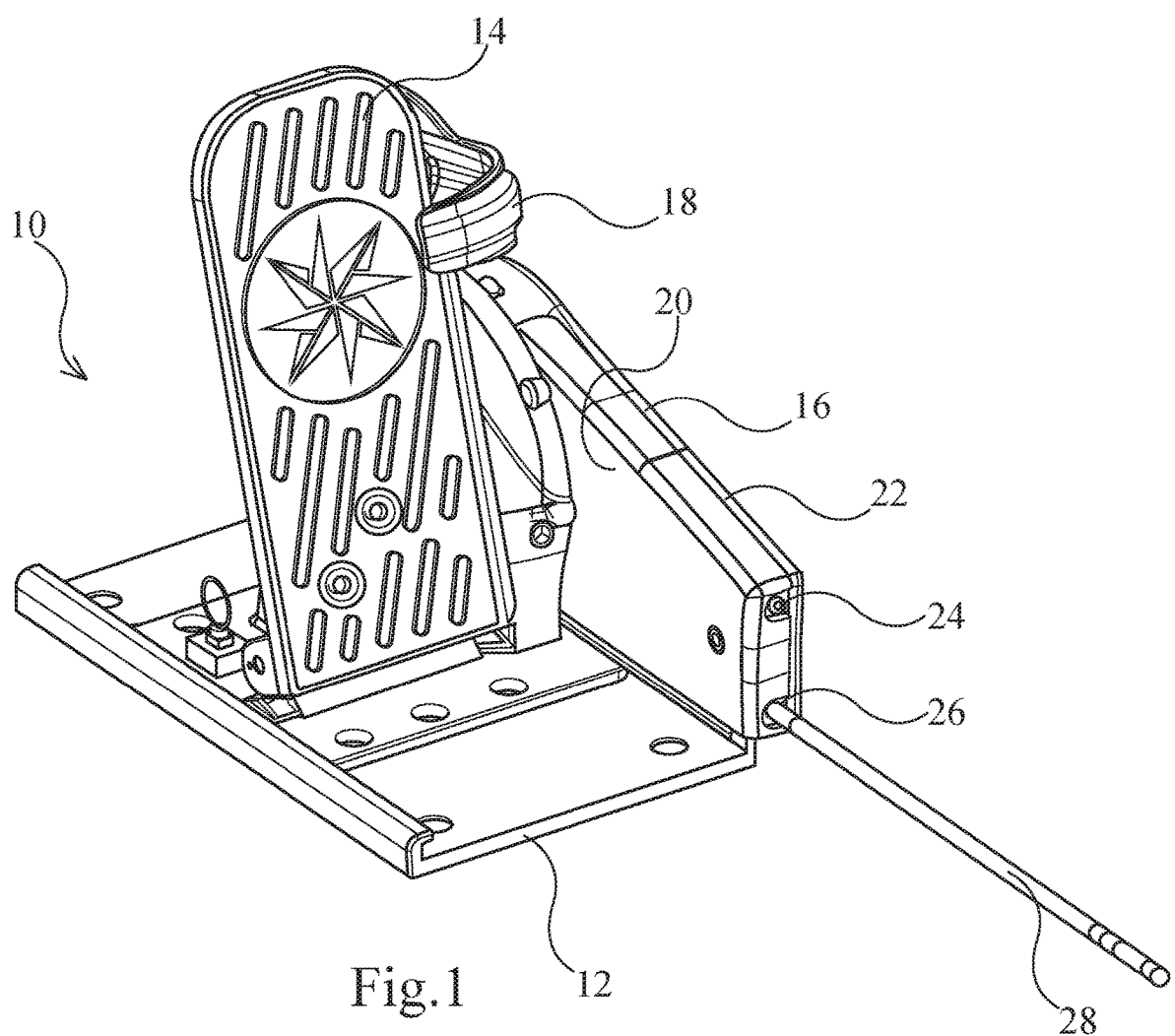
FIG. 1 is a front perspective view of a throttle pedal assembly.
Figure 2:
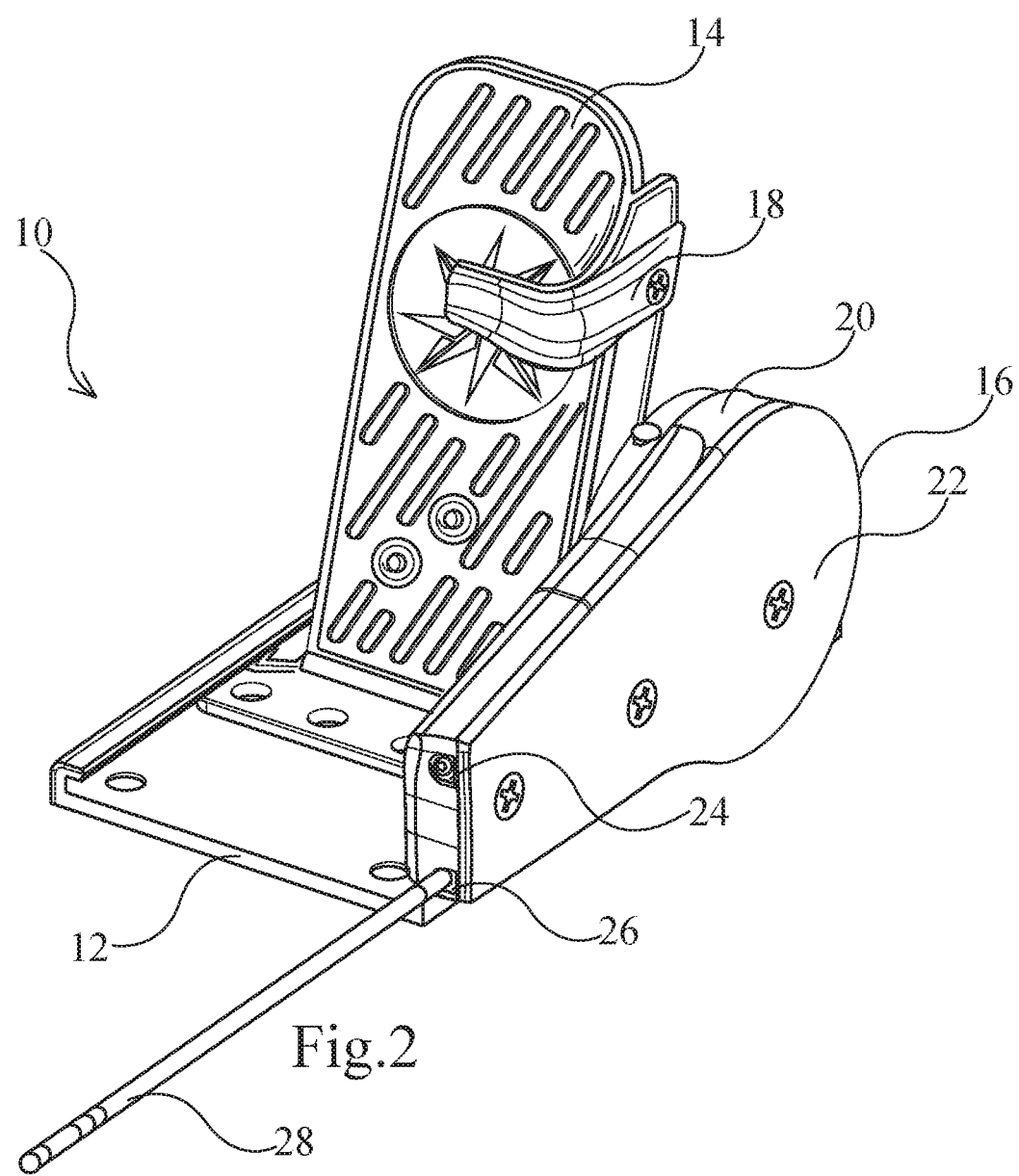
FIG. 2 is another front perspective view of the throttle pedal assembly.
Figure 3:
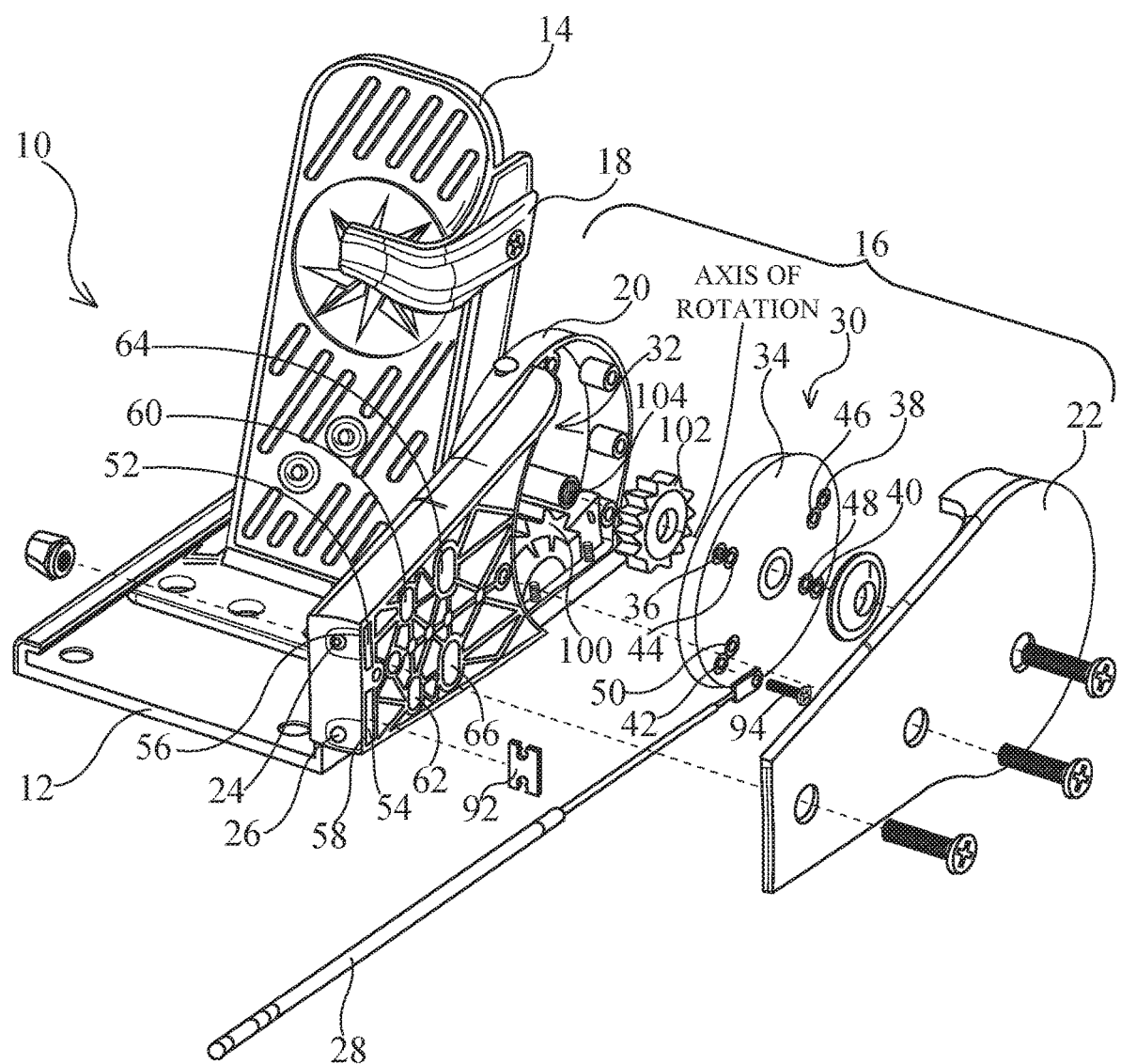
FIG. 3 is an exploded perspective view of the throttle pedal assembly.

Referring to the drawings and first to FIGS. 1 and 2, there is shown a throttle pedal assembly 10 which generally comprises a base 12, a pedal 14 pivotally mounted on the base 12, and a gear box 16 coupled to the pedal 14. The pedal 14 is provided with a toe hook 18, in this example, but this is not required. The gear box 16 includes a housing 20 and a housing cover 22. There are openings 24 and 26 in the housing 20 through which a throttle cable 28 may extend. Referring now to FIG. 3, the housing 20 houses a cable mounting mechanism 30 and a cable actuation mechanism 32. The housing 20 and the housing cover 22 restrict the introduction of foreign material that may interfere with the operation of the throttle pedal assembly 10 and, in particular, with the operation of the cable mounting mechanism 30 and the cable actuation mechanism 32 when the throttle pedal assembly 10 is in use.

In this example, the cable mounting mechanism 30 includes a throttle wheel 34 having a plurality of throttle cable terminal attachment locations, for example, throttle cable terminal attachment locations 36, 38, 40, 42, 44, 46, 48 and 50 as defined below.

| | |
|---|---|
| 36 | High Resolution Cable Terminal Attachment Location A |
| 38 | High Resolution Cable Terminal Attachment Location B |
| 40 | High Resolution Cable Terminal Attachment Location C |
| 42 | High Resolution Cable Terminal Attachment Location D |
| 44 | Low Resolution Cable Terminal Attachment Location A |
| 46 | Low Resolution Cable Terminal Attachment Location B |
| 48 | Low Resolution Cable Terminal Attachment Location C |
| 50 | Low Resolution Cable Terminal Attachment Location D |

The cable terminal attachment locations 36, 38, 40, 42, 44, 46, 48 and 50 rotate about a fixed axis of rotation and relative movement between the cable terminal attachment locations 36, 38, 40, 42, 44, 46, 48 and 50 and defined cable pivot locations 52 and 54 generate linear motion of the throttle cable 28. The attachment of the throttle cable 28 to different ones of the throttle cable terminal attachment locations 36, 38, 40, 42, 44, 46, 48 and 50 enables the adjustment of the sensitivity and stiffness of the throttle pedal assembly 10. Each of the cable terminal attachment locations 36, 38, 40, 42, 44, 46, 48 and 50 is defined by a concentric circle that generates a moment arm about the rotational axis of the throttle wheel 34. The cable terminal attachment locations 36, 38, 40 and 42 define an outer race. The cable terminal attachment locations 44, 46, 48 and 50 define an inner race. There is more sensitivity and higher perceived actuation load when the throttle cable 28 is attached to an outer race. There is less sensitivity and lower perceived actuation load when the throttle cable 28 is attached to an inner race.

The cable mounting mechanism 30 also includes a plurality of throttle cable mounting locations 56, 58, 60, 62, 64 and 66 as defined, for example, below.

---

56 30 Series Cable and Mercury Generation II Cable Mounting Location A
58 30 Series Cable and Mercury Generation II Cable Mounting Location B
60 OMC Cable Mounting Location A
62 OMC Cable Mounting Location B
64 Mercury Generation I Cable Mounting Location A
66 Mercury Generation I Cable Mounting Location B

---

Figure 4:
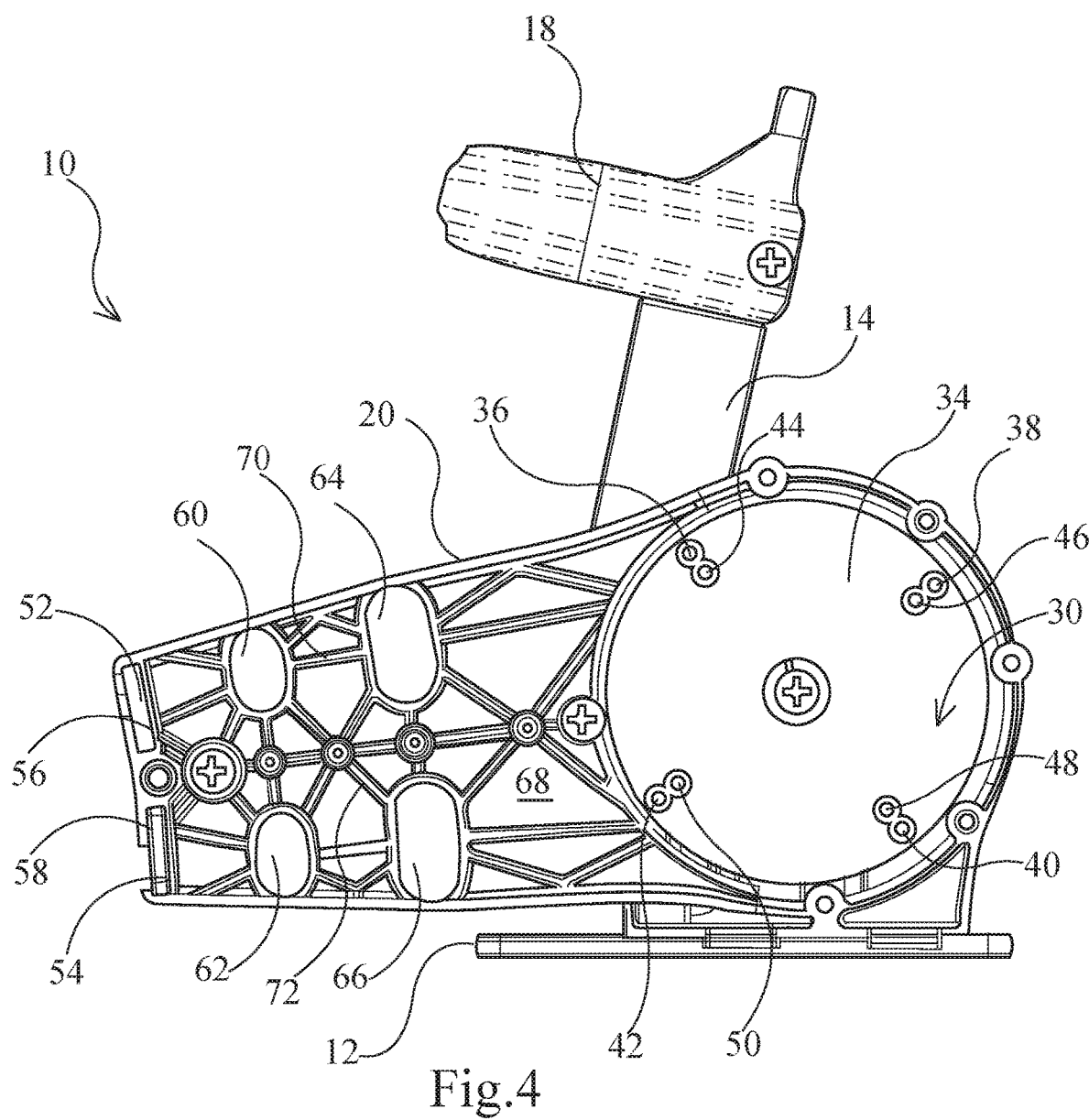
FIG. 4 is a side elevation view of the throttle pedal assembly with a housing cover of a gear box removed.
Figure 5:
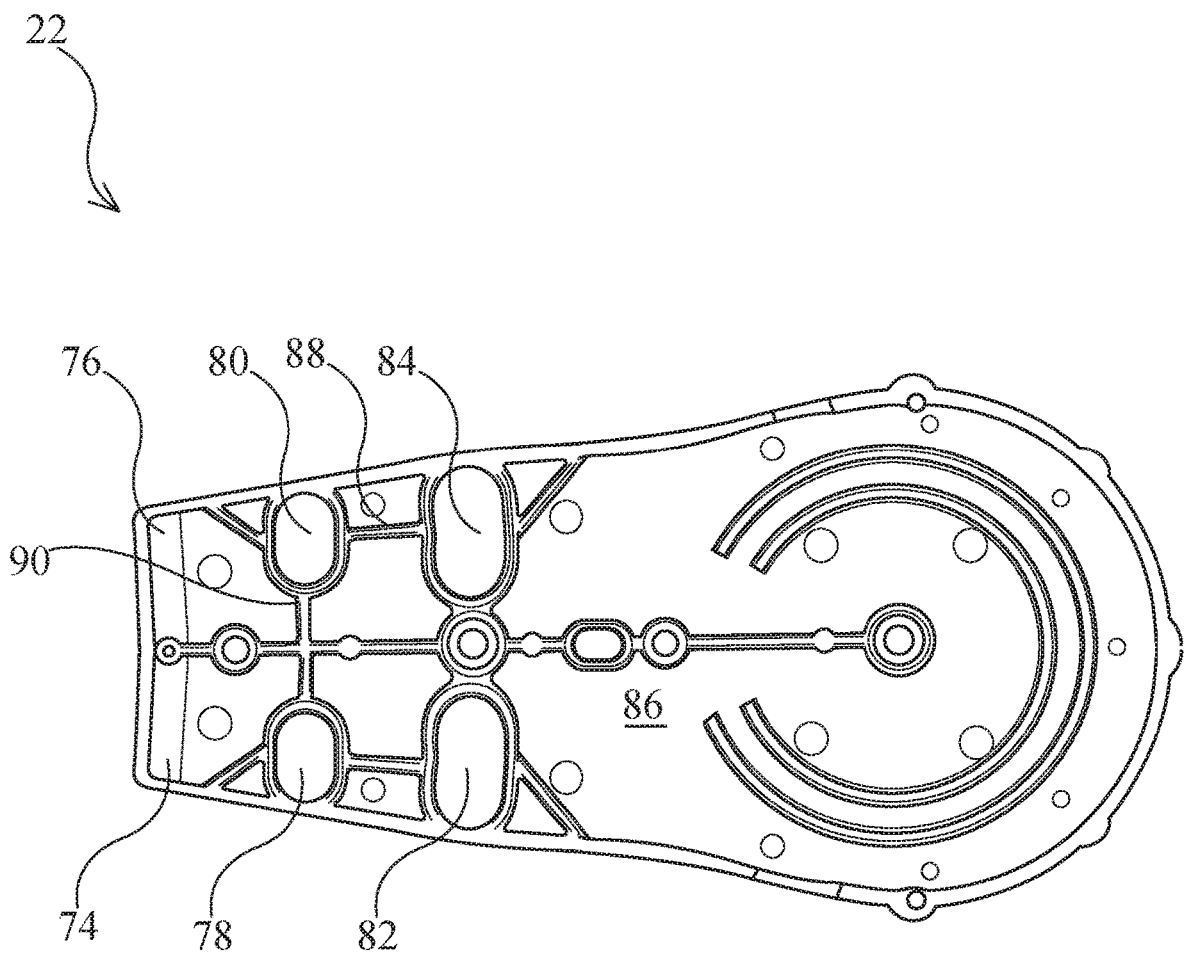
FIG. 5 is a side elevation view of the housing cover of the gear box.

Referring now to FIG. 4, the throttle cable mounting locations 56, 58, 60, 62, 64 and 66 may be channels and/or keying features on an inner wall 68 of the housing 20. There may also be strengthening ribs, for example, strengthening ribs 70 and 72 on the inner wall 68 of the housing 20. There are, as shown in FIG. 5, corresponding complementary throttle cable mounting locations 74, 76, 78, 80, 82 and 84 on an inner wall 86 of the housing cover 22. The complementary throttle cable mounting locations 74, 76, 78, 80, 82 and 84 may likewise be channels and/or keying features. There may also be strengthening ribs, for example, strengthening ribs 88 and 90 on the inner wall 86 of the housing cover 22. The throttle cable mounting locations 56, 58, 60, 62, 64 and 66, on the inner wall 68 of the housing 20, and the complementary throttle cable mounting locations 74, 76, 78, 80, 82 and 84, on the inner wall 86 of the housing cover 22, allow the throttle pedal assembly 10 to interface with commonly available marine grade push/pull cables, as shown in FIGS. 6A to 6B, which may be employed as the throttle cable without the need for aftermarket components.

Figure 6A:
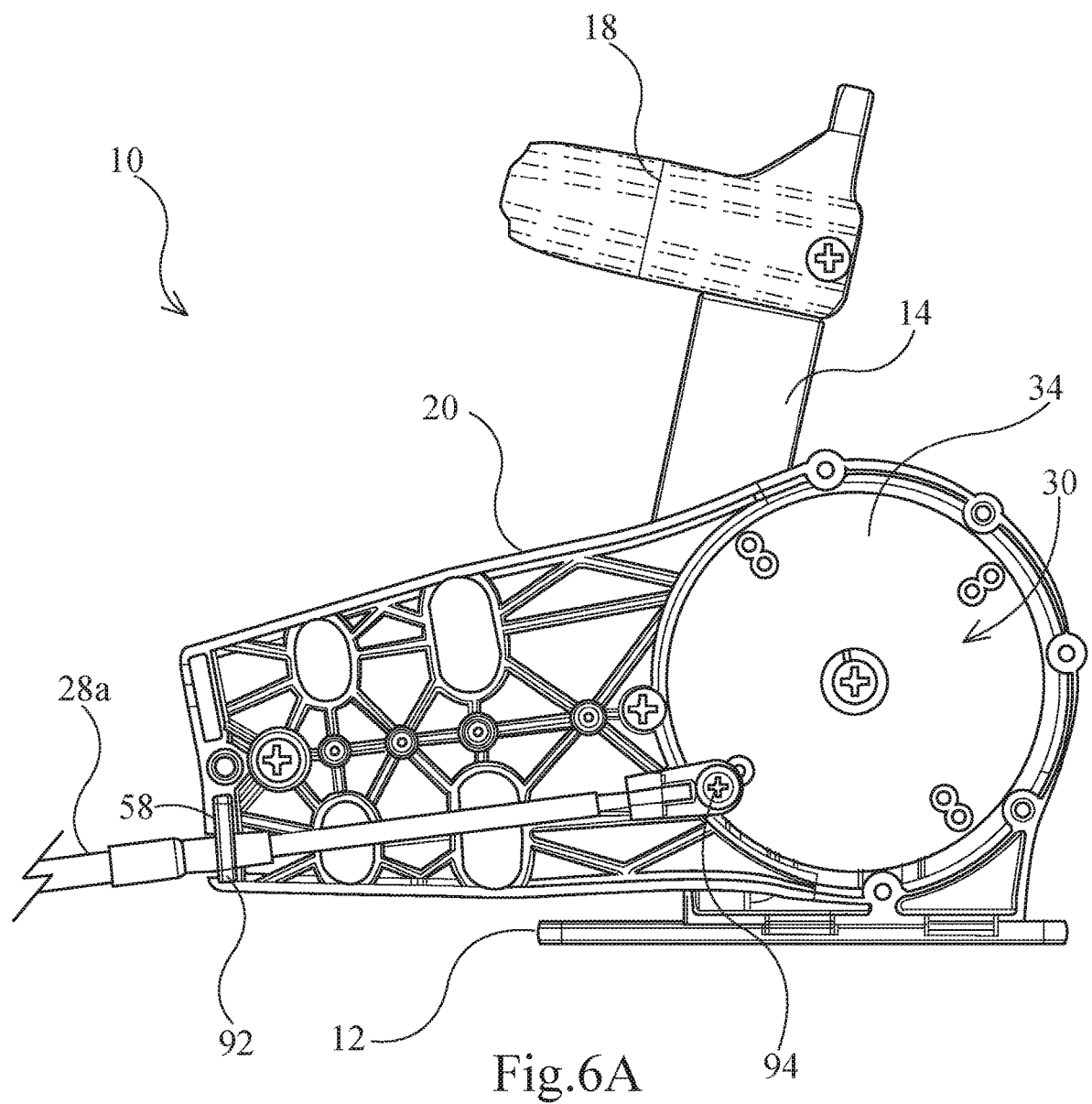
FIGS. 6A to 6D are side elevation views of the throttle pedal assembly with a housing cover of a gear box removed and a throttle cable attached to the throttle wheel and mounted to a cable mounting locations.
Figure 6B:
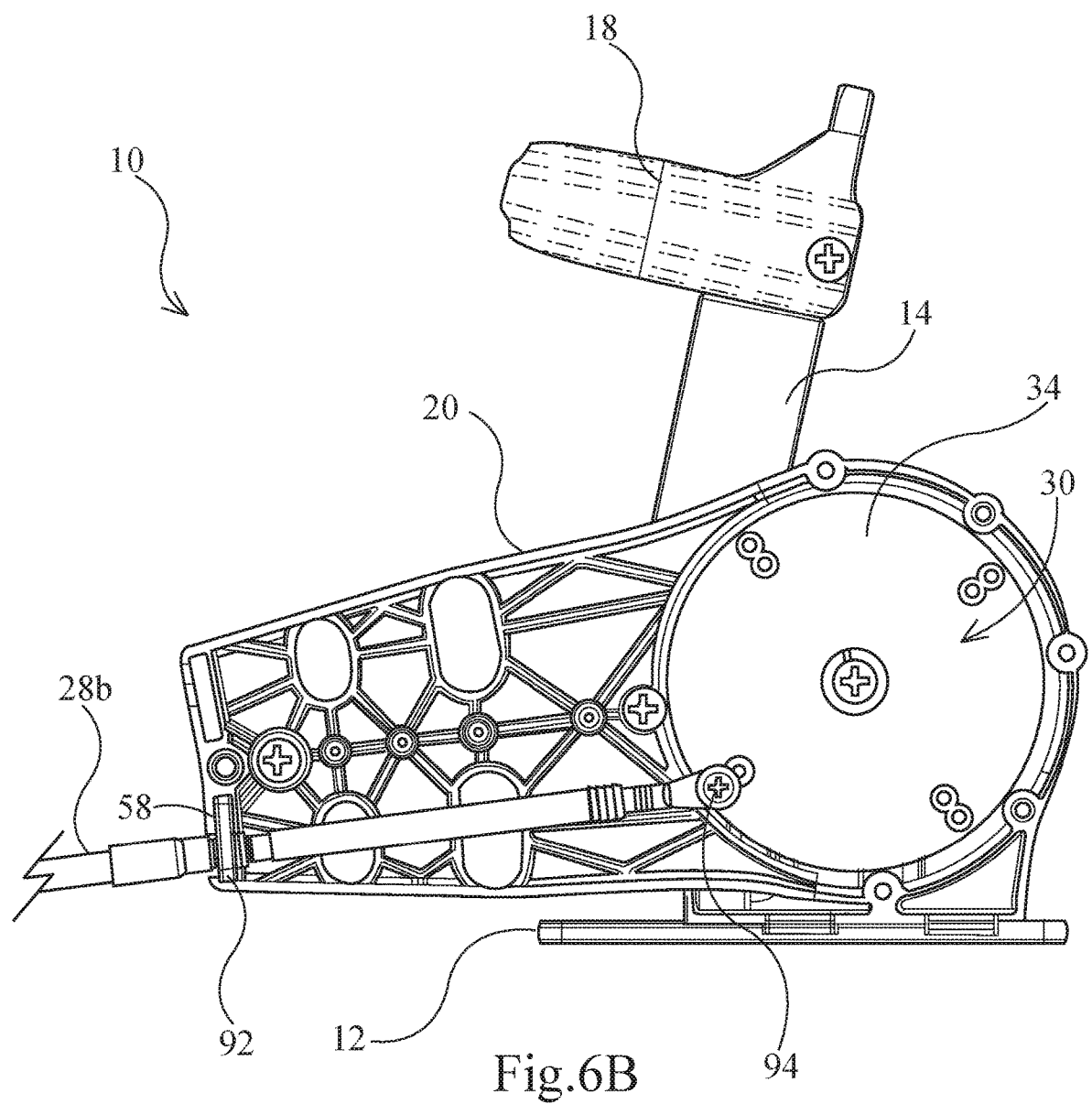
Figure 6C:
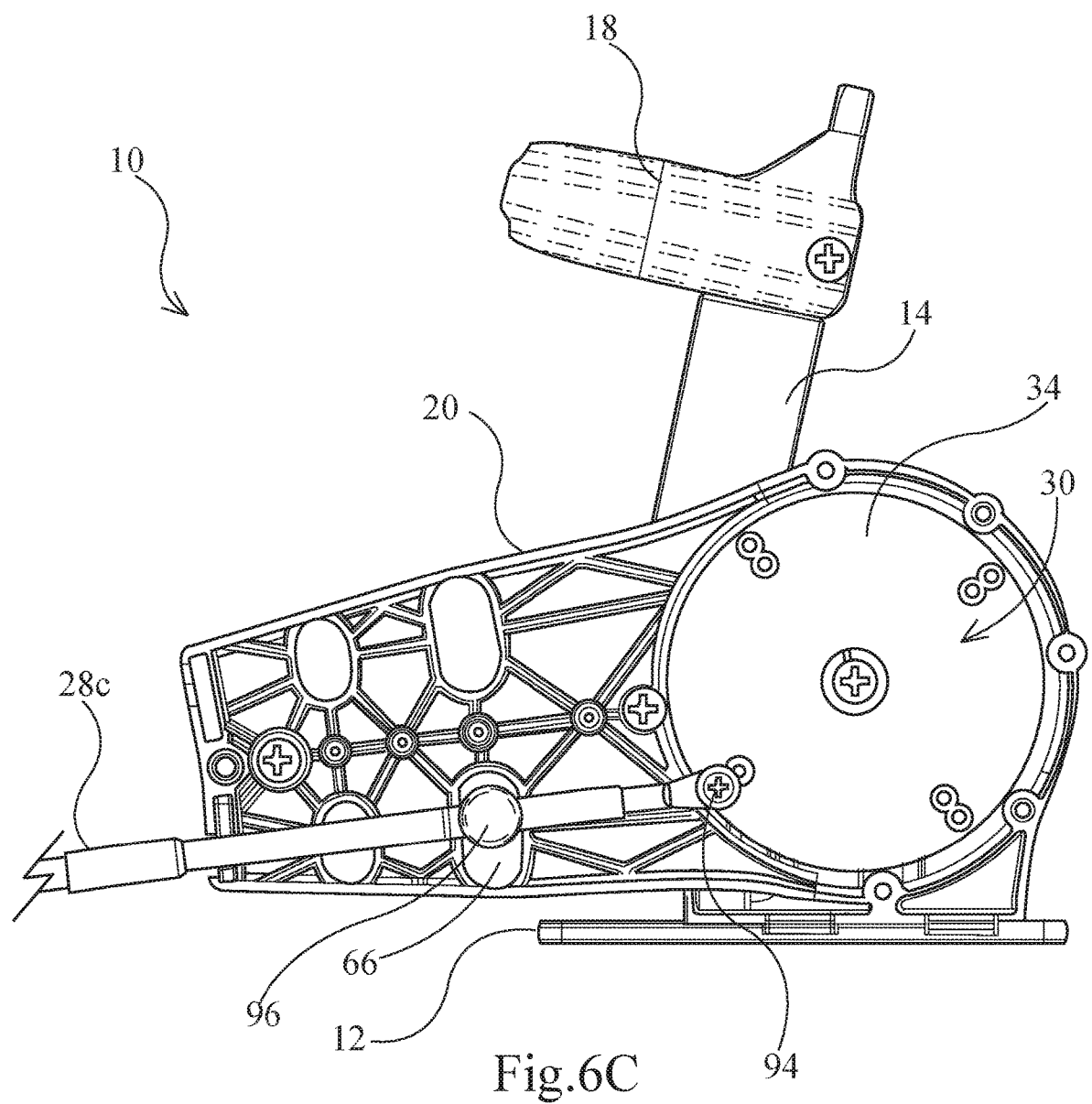
Figure 6D:
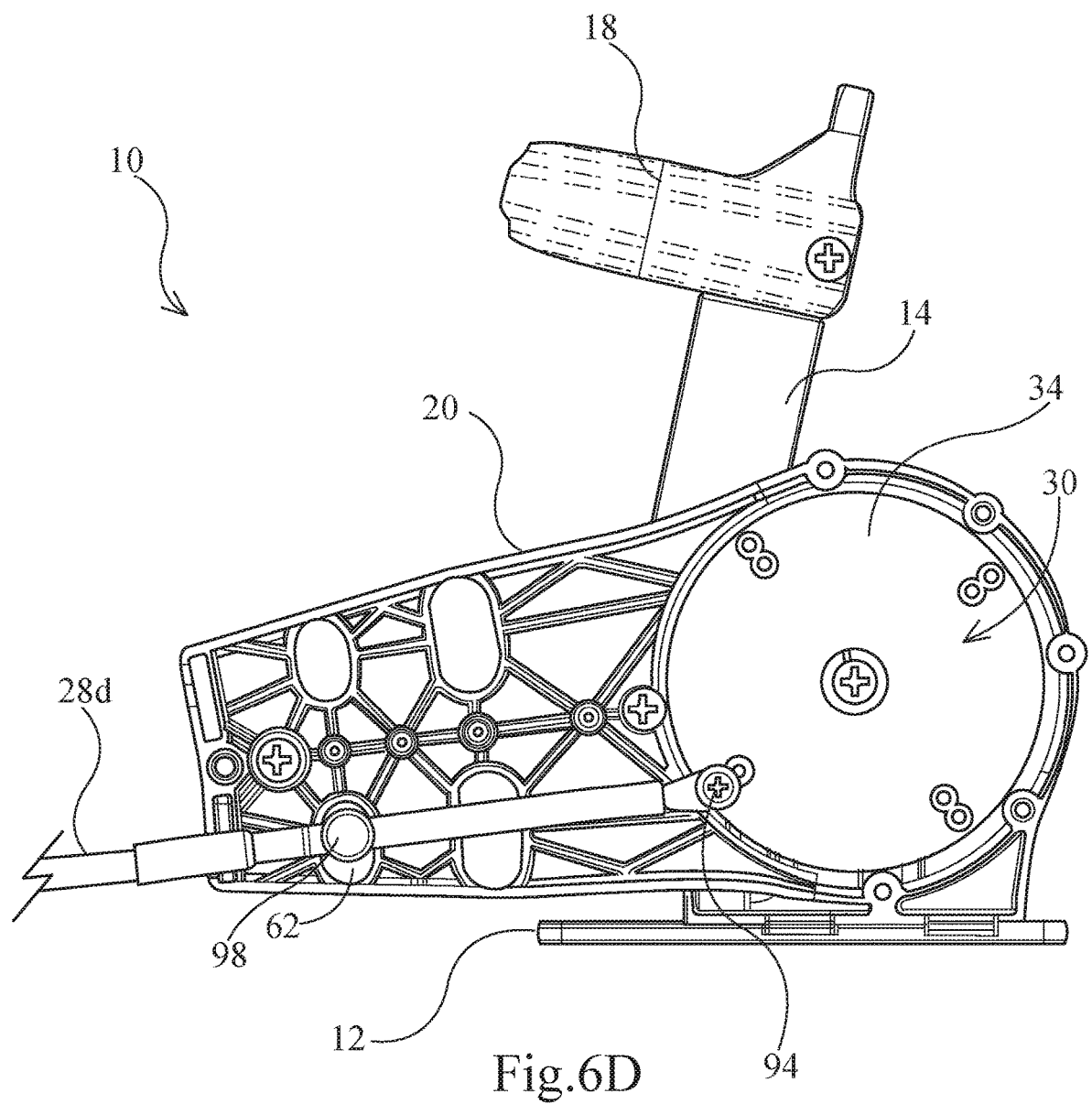

FIG. 6A shows a throttle cable 28a which, in this example, is a 30 Series Cable mounted at mounting location 58 on the housing 20 by a retainer clip 92. It will be understood by a person skilled in the art that the throttle cable 28a is also mounted at mounting location 74, shown in FIG. 5, on the housing cover 22. The throttle cable 28a is connected to the throttle wheel 34 by a screw 94. FIG. 6B shows a throttle cable 28b which, in this example, is a Mercury Generation II Cable mounted at mounting location 58 by the retainer clip 92. It will be understood by a person skilled in the art that the throttle cable 28b is also mounted at mounting location 74, shown in FIG. 5, on the housing cover 22. The throttle cable 28b is connected to the throttle wheel 34 by the screw 94. FIG. 6C shows a throttle cable 28c which, in this example, is a Mercury Generation II Cable mounted by its barrel 96 at mounting location 66 on the housing 20. It will be understood by a person skilled in the art that the throttle cable 28c is also mounted by its barrel 96 at mounting location 82, shown in FIG. 5, on the housing cover 22. The throttle cable 28c is also connected to the throttle wheel 34 by the screw 94. FIG. 6D shows a throttle cable 28d which, in this example, is an OMC Cable mounted by its barrel 98 at mounting location 62 on the housing 20. It will be understood by a person skilled in the art that the throttle cable 28d is also mounted by its barrel 98 at mounting location 78, shown in FIG. 5, on the housing cover 22. The throttle cable 28d is also connected to the throttle wheel 34 by the screw 94. It will further be understood by a person skilled in the art that, in other examples, the throttle cable mounting locations may be for other types of cables.

Referring back to FIG. 3, the cable actuation mechanism 32 includes a segment gear 100 and a spur gear 102. The segment gear 100 is rigidly mounted on the pedal 14 and the spur gear 102 is rigidly mounted on the throttle wheel 34. The spur gear 102 and the throttle wheel 34 are concentrically and rotatably mounted on a shaft 104 which is coaxial with the axis of rotation. The segment gear 100 engages the spur gear 102 and pivoting of the pedal 14 accordingly rotates the throttle wheel 34 which, in turn, moves a terminal end of the throttle cable 28 through a defined arc segment. This movement, together with the virtual axis of the throttle cable 28, results in linear motion of the throttle cable 28 to throttle an engine.

Figure 7A:
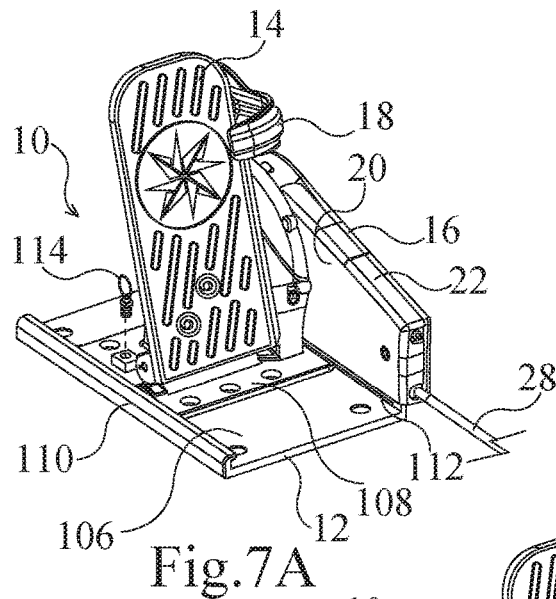
FIGS. 7A to 7C are side elevation views of the throttle pedal assembly as shown in FIG. 3 with an output orientation of the throttle cable adjusted.
Figure 7B:
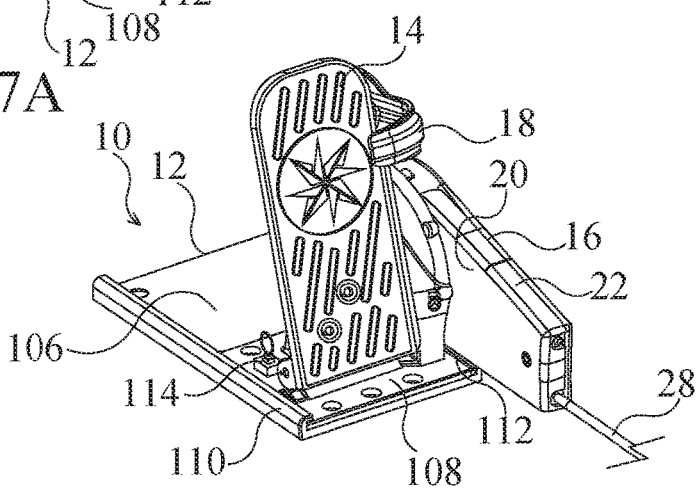
Figure 7C:
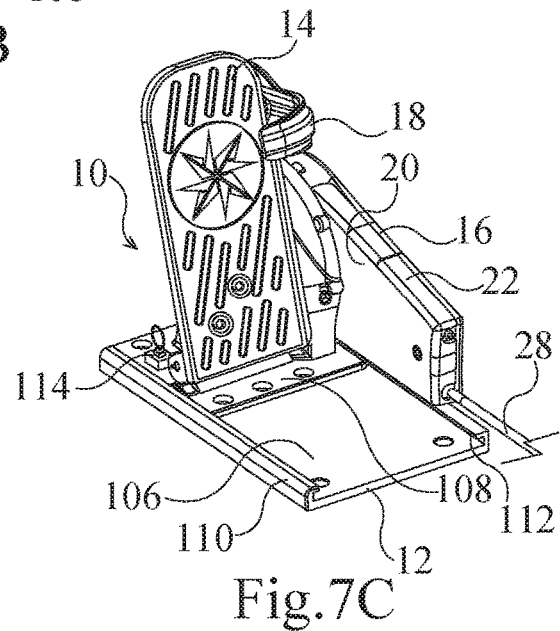

FIGS. 7A to 7C show that the base 12 of the throttle pedal assembly 10 includes a base plate 106 and a slider plate 108. The base plate 106 is provided with rails 110 and 112 which receive the slider plate 108. The base plate 106 is configured to be mounted on a floor of a vehicle, for example a marine vessel, and the slider plate 108 is able to slide relative to the base plate 106. The pedal 14 is mounted on the slider plate 106 and is accordingly also able to slide relative to the base plate 106. This allows the pedal to be positioned in a desired location relative to the base plate 106. The throttle pedal assembly 10 is further provided with a detent, in form of a locating boss 114, which engages with the base plate 106 and the slider plate 108 to maintain the pedal 14 in a desired position. The locating boss 114 may be released to allow the pedal 14 to be re-positioned and the locating boss 114 may be subsequently re-engaged to maintain the pedal 14 in position. This allows the throttle pedal assembly 10 to be mounted in different configurations.

Figure 8A:
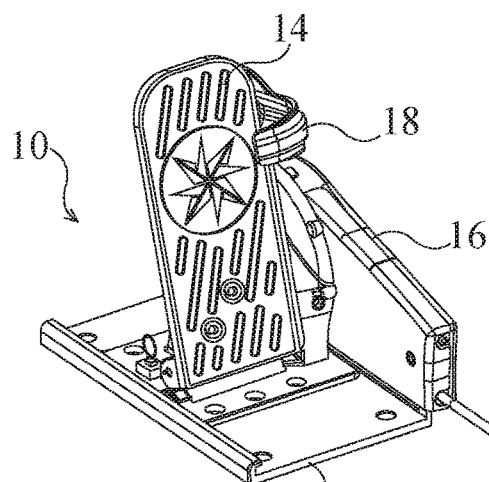
FIGS. 8A to 8C are front elevation views of the throttle pedal assembly as shown in FIG. 3 with an output orientation of the throttle cable adjusted.
Figure 8B:
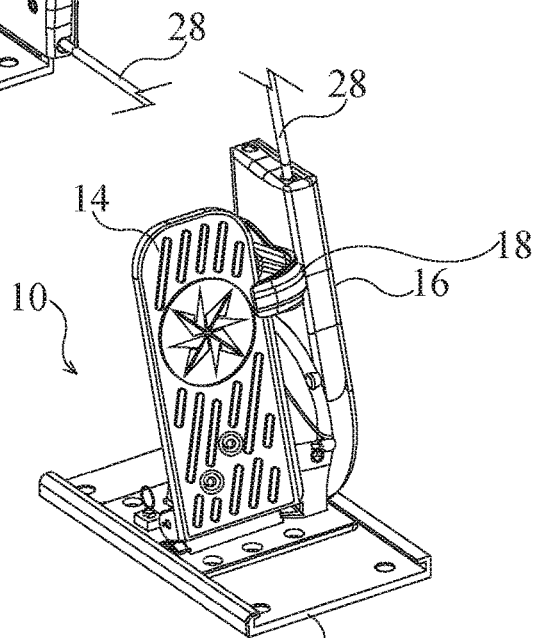
Figure 8C:
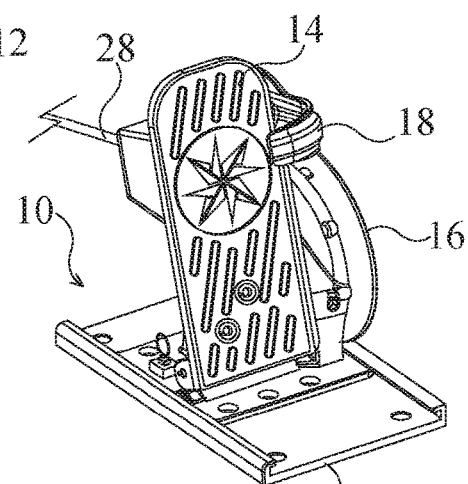

An output orientation of the throttle cable 28 may also be adjusted by pivoting the gear box 16 as shown in FIGS. 8A to 8C. For example, the output orientation of the throttle cable 28 may be routed rearward towards a stern of the marine vessel as shown in FIG. 8A, or upward into a console or gunwale as shown in FIG. 8B, or forward toward a bow of the marine vessel as shown in FIG. 8C. This allows the throttle pedal assembly 10 to be mounted in different configurations.

It will be understood by a person skilled in the art that many of the details provided above are by way of example only, and are not intended to limit the scope of the invention which is to be determined with reference to the following claims.

What is claimed is:

1. A throttle pedal assembly comprising:
   a base;
   a pedal pivotably mounted on the base; and
   a gear box coupled to the pedal, the gear box having a throttle wheel with a plurality of throttle cable terminal attachment locations and the gear box having a plurality of throttle cable mounting locations, wherein a throttle cable is selectively attached to one of said plurality of throttle cable terminal attachment locations and the throttle cable is selectively attached to one of said plurality of throttle cable mounting locations.

2. The throttle pedal assembly as claimed in claim 1 wherein the throttle wheel has an axis of rotation and said of plurality throttle cable terminal attachment locations define an inner race and an outer race about the axis of rotation.

3. The throttle pedal assembly as claimed in claim 1 wherein the gear box has a housing and a housing cover, and the cable mounting locations are keyed into a wall of the housing or a wall of the housing cover or both.

4. The throttle pedal assembly as claimed in claim 1 wherein the pedal is coupled to the gear box by a cable actuation mechanism which drives the throttle wheel.

5. The throttle pedal assembly as claimed in claim 4 wherein the cable actuation mechanism and the throttle wheel are disposed within a housing of the gear box.

6. The throttle pedal assembly as claimed in claim 1 wherein the base includes a base plate and a slider plate which is slidable relative to the base plate, and the pedal being mounted on the slider plate.

7. The throttle pedal assembly as claimed in claim 6 wherein the base is provided with a detent to maintain the slider plate in a desired location relative to the base plate.

8. The throttle pedal assembly as claimed in claim 1 wherein an output orientation of the throttle cable is adjusted by pivoting the gear box relative to the pedal.

\* \* \* \* \*